United States Patent

Kessler et al.

[15] 3,707,323
[45] Dec. 26, 1972

[54] LIQUID CRYSTAL DEVICES AND SYSTEMS FOR ULTRASONIC IMAGING

[72] Inventors: Lawrence W. Kessler, Glenview, Ill. 60025; Samuel P. Sawyer, Evanston, Ill. 60201

[73] Assignee: Zenith Radio Corporation, Chicago, Ill.

[22] Filed: Nov. 6, 1970

[21] Appl. No.: 87,553

[52] U.S. Cl. ............................. 350/161, 350/160 R
[51] Int. Cl. ............................................. G02f 1/16
[58] Field of Search ............... 350/3.5, 150, 160, 161; 250/199; 332/7.51

[56] References Cited

UNITED STATES PATENTS 3,597,043   8/1971   Dryer ........................ 350/150

*Primary Examiner*—Ronald L. Wibert
*Assistant Examiner*—Edward S. Bauer
*Attorney*—John J. Pederson

[57] ABSTRACT

A device is disclosed which includes a layer comprising a nematic liquid crystal toward which ultrasonic wavefronts are directed. A marked change over any particular area of the layer occurs from a clear state to a light-scattering state when the intensity of the ultrasound applied to that area exceeds a threshold value. The degree of light scattering obtainable is found to be functionally related to the intensity of the applied ultrasound above the threshold. A matrixed array of such devices is arranged in a system with suitable ultrasonic addressing means and scanning means to provide a real-time image display system having a gray-scale. A system for visualizing ultrasonic image information either conventionally or holographically is also provided by causing a sound beam carrying image information as well as a reference beam to impinge on a common area of such a device. The resulting pattern of ultrasonic intensity variations over the area causes light to be variably scattered from different points in the area in accordance with the ultrasonic intensity pattern, thereby rendering visible the analogue optical hologram of the image.

9 Claims, 6 Drawing Figures

Absorptive Mode

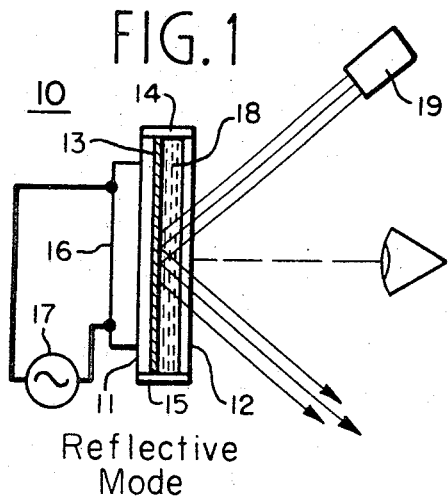
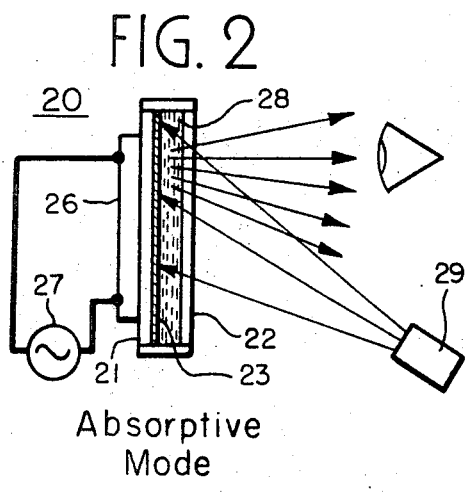
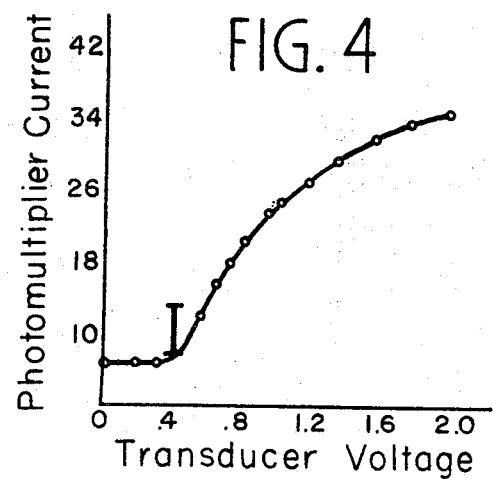
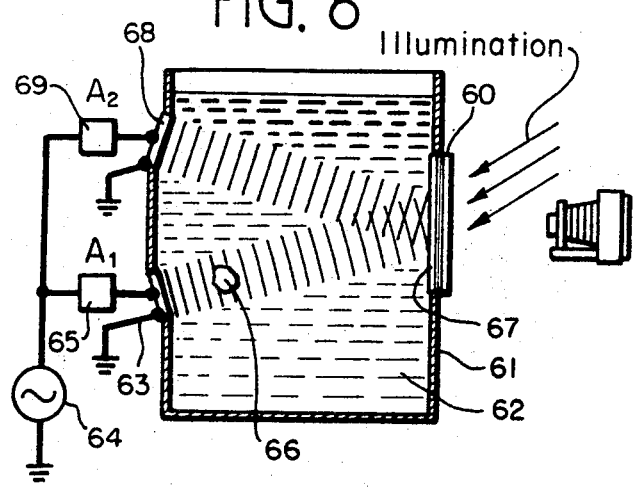
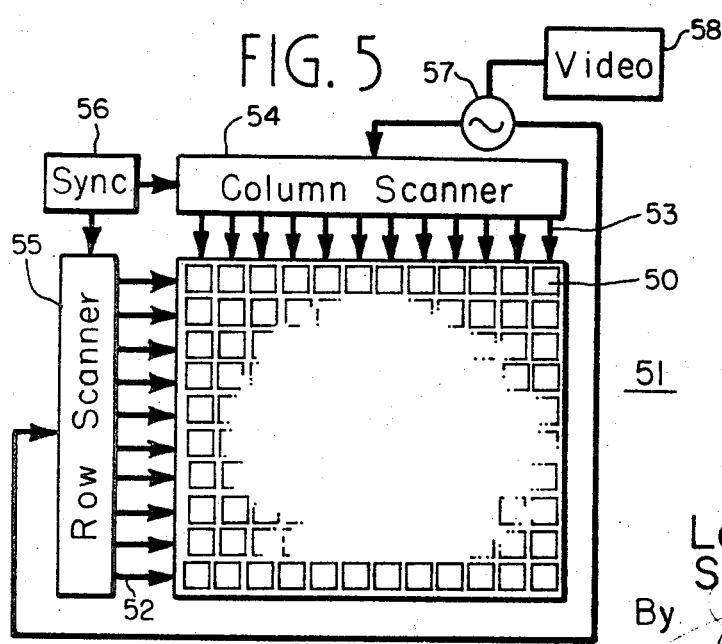
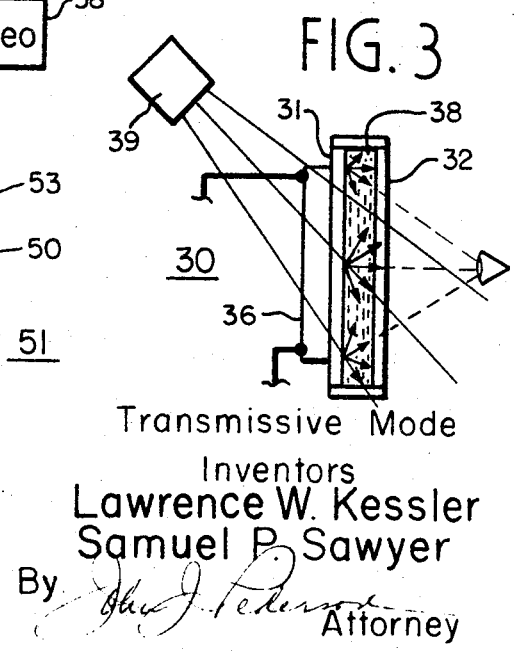

LIQUID CRYSTAL DEVICES AND SYSTEMS FOR ULTRASONIC IMAGING

BACKGROUND OF THE INVENTION

This invention relates to acousto-optical display systems or devices for variably modulating light in response to sound fields. More particularly, the invention relates to novel displays wherein a layer of nematic liquid crystal compound is the active element by which sound-borne information is visualized optically through an effect which appears to be similar to dynamic optical scattering.

The present state of the art includes many varieties of liquid crystal devices which depend on dynamic optical scattering as their light-modulating or switching principle; for an explanation of the physical phenomenon of dynamic scattering and descriptions of well-known devices dependent on this phenomenon and their operation, see the article by G.H. Heilmeir, L.A. Zanoni and L.A. Barton, *Proc. IEEE*, 56, 1162 (1968). Such liquid crystal display devices generally depend on the opto-electric properties of the compounds and require actuation by the application of an electric field or magnetic field to change from a quiescent, transparent state to a turbid, light-scattering condition.

Display devices have also been constructed which depend on certain temperature-dependent properties of liquid crystals of the cholesteric variety to visualize a sound field. Specifically, color changes in a layer of crystal, mapping out of the sound field, are induced in accordance with temperature variations in the crystal, which are in turn induced by a sound-absorbent layer in contact with the crystal in which heat is generated by impinging ultrasonic energy of this ultrasonic field. The spatial variations of temperature thereby set up over the area of the liquid crystal must be carefully maintained within very narrow limits, i.e., of the order of b 1° C., across the liquid crystal surface to develop a stable image. Of course, an ultrasonic power level sufficient to insure the degree of energy absorption necessary to cause such a temperature variation must be maintained. For a more detailed exposition, see B.D. Cook, A. Werchan, *J. Acoust. Soc. Amer.*, Vol 47, Pt. 1, 74 (1970) and J.F. Havlice, *Electronics Letters*, 5,477 (1969).

Still other devices exist which visualize the maxima and minima of two interfering ultrasonic beams; however, they depend on the property of certain liquid crystals of rotating the polarization of a beam of plane-polarized light incident upon it. Specifically, a layer of cholesteral chloride, upon which the two sound beams are allowed to interfere, is found to effect such a rotation in accordance with the distribution of the acoustic energy. When viewed through an appropriate analyzer, a hologram is displayed at the cholesteric layer. See British Pat. No. 1,194,544 to Battelle Development Corp., published June 10, 1970.

A similar effect has been observed in a study of domain structures as they appear under a microscope within liquid crystals; see A. P. Kapustin and L. M. Dmitriev, *Sov. Phys. Crystallography*, Vol. 7, pg. 263 (1962). The study indicated that certain alterations in the domain structure caused by applied ultrasound at 720 kilohertz and at 1.8 megahertz can be visualized under the microscope, provided linearly polarized light illuminates the crystal and an appropriate analyzer filter is used. With one type of liquid crystal, a mechanical pre-pressurizing or squeezing of the liquid crystal to effect a uniform alignment among the molecules was required, and a decrease in transparency was observed which was not reversible with the removal of the ultrasound.

OBJECT OF THE INVENTION

An object of the invention is to provide a novel liquid crystal device for the modulation of incident light in accordance with an applied ultrasonic field in a manner visible directly with the unaided eye.

Another object of the invention is to provide a novel liquid crystal device which, while not relying for actuation on electric or magnetic fields nor on temperature-induced color changes or light polarization, yet modulates light in a dynamic light-scattering manner comparable to such known field-actuated devices.

A more specific object of the invention is to provide an ultrasonically-actuated light-modulating liquid crystal device having a definite threshold value for the applied ultrasonic intensity below which the device returns to a quiescent state and no light modulation occurs, and above which the degree of light modulation is functionally related to the intensity of the field.

Yet another object of the invention is to provide an ultrasonically-actuated display device and system for the real-time display of image information.

Still another object of the invention is to provide a liquid crystal device and system for the direct visualization of an applied ultrasonic field bearing image information which may be in holographic form.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIG. 1 is a side view of an elemental light-modulating ultrasonically-responsive device according to the invention, adapted for the reflective mode of operation;

FIG. 2 is a side view of an elemental device according to the invention, adapted for the absorptive mode;

FIG. 3 is a side view of an elemental light modulating device according to the invention, adapted for the transmissive mode of operation;

FIG. 4 is a graph showing the relationship between the intensity of ultrasonic stimulation applied to the device and the degree to which it scatters light;

FIG. 5 is a schematic illustration of a basic image display system utilizing a matrix of any of the above devices, according to the invention; and FIG. 6 is a schematic illustration of a basic system for visualizing the ultrasonic field bearing image information in the form of a hologram.

DESCRIPTION OF THE PREFERRED EMBODIMENTS

The device 10 of FIG. 1 includes two spaced opposed plates 11 and 12 which are made from, for example, glass, one of which has an optically reflective coating 13 which may be on either side of that plate. Spacers 14 and 15 maintain the plates parallel to each other and at a separation of the order of 1 mil. A sound transducer 16 of a piezoelectric material, such as barium titanate or quartz, is mounted on the back plate 11 which bears the reflective coating and is itself connected to a signal source 17.

The space between the opposed plates 11 and 12 is filled with a material which comprises liquid crystal of the nematic type, such as p-methoxy-benzylidine, p-n butyl-aniline 4-methoxy, 4'n-butyl-benzylidine-aniline; in this case, the pure crystal was used. Such nematic crystal must be kept within their nematic temperature range, which for this particular crystal is 10° C. to 47° C. It has been found that the nature of the chemical composition of the nematic crystal is not critical; moreover, mixtures of other types of liquid crystals with a nematic liquid crystal may be used. Although the layer of liquid crystal 18 thus formed is preferably of the order of 1 mil in thickness, this is an exemplary magnitude and is not crucial to the operation of the device; however, when the thickness is a multiple half-wavelength of sound, the opposed plates form a resonant cavity about the layer which will enhance the effect of the sound.

The layer of liquid crystal can also be enclosed directly between the faceplate 12 and the sound transducer 16, which can be coated as required, to dispense entirely with the back plate 11. Thus, the faceplate 12 is transparent to light but preferably reflective to sound; glass is a suitable material, as has been mentioned. It receives either ambient light or for greater contrast, a quasi-collimated beam of light from light source 19 which illuminates the device 10. In either case, however, the light rays should predominantly impinge at an angle such that the reflective coating 13 of back plate 11 reflects away most of the light from the eye of a viewer positioned in the normal viewing position; i.e., in front of the plate 12 on a line normal to that plate, as is illustrated.

The liquid crystal layer 18 is at this point quiescent and essentially transparent, and the observer perceives the device as comparatively dark. With the source 17 generating an AC signal of appropriate frequency and of variable intensity, the liquid crystal layer 18 is stimulated by an ultrasonic field generated by transducer 16, which vibrates in response to the signal. Although the transducer is preferably driven in the compressional mode, other excitation modes such as shear, transverse or surface will also serve. The frequency of the driving signal from source 17 must be of the order of 10 megahertz or higher; in the present embodiment, a 10 megahertz signal was used. An observer viewing with the unaided eye sees no change in the optical properties of the device 10 until a certain threshold value of ultrasonic field intensity in the frequency range indicated above is reached. This value will vary with the type of liquid crystal compound and the thickness of the liquid crystal layer 18; in the present embodiment it was found to average that ultrasonic power which will be produced by a piezoelectric transducer driven at an electrical power of 15 milliwatts/cm$^2$.

Once the ultrasonic field intensity applied to the crystal layer 18 reaches threshold, a sudden and marked increase in the light-scattering capability of the layer 18 takes place, and the observer now sees as bright the entire ultrasonically-stimulated area which hitherto was dark. This is, of course, because much less of the light initially directed to the device is now reflected away; rather, a substantial fraction of this previously-lost light is now scattered in many directions by the stimulated layer 18 so that much more light is now received by the eye of the observer directly as well as by virtue of being reflected from reflective coating 13. Thus the foregoing has described an embodiment wherein the reflectivity to incident light is controlled, but also of interest are embodiments in which the control of light absorption, as well as the control of light transmission is effected. The former will be described in connection with FIG. 2, and the latter in FIG. 3.

FIG. 2 illustrates a device 20 similar to that of FIG. 1 according to the invention, except that it is constructed with a back plate 21 of black light-absorbing material or with a coating of light-absorbent material 23 separating plate 21 from the liquid crystal layer 28. Ambient light or light from source 29 illuminating the entire area of a clear front plate 22 passes the plate and the clear quiescent liquid crystal layer 28 and is finally incident on the dark light absorbent layer or surface 23. At this point most of the light is absorbed, and the observer sees the device as dark because so little of the incident light emerges. Upon the actuation of transducer 26 by the AC signal from ultrasonic generator 27, and the resulting application of an ultrasonic field to crystal layer 28, the light originally incident on the dark surface is scattered in many directions so that some now reaches the observer who thus sees the ultrasonically-stimulated device as bright.

FIG. 3 illustrates a device 30 constructed similarly to those described above, except for features permitting the control of light transmission by the device. The back plate 31 in this case must be of a transparent material, for example, glass; likewise the sound transducer 36 must be of a transparent material, preferably quartz, and carry transparent electrodes, preferably thin tin oxide coatings, on the faces of the transducer. A light source 39 is positioned to illuminate the entire area of light-transmissive sound transducer 36 and back plate 31. With the device in the quiescent state, most of the light continues through liquid crystal layer 38 and front plate 32 away from the eye of an observer viewing that plate. But upon the ultrasonic field being raised beyond threshold level, the light previously traveling through layer 38 relatively unimpeded is now scattered, so that the observer now sees the ultrasonically stimulated area become brighter.

In accordance with another feature of the invention, it has been found that the ultrasonically-induced light scattering in each of the above cases is a function of the amplitude of the ultrasonic field applied to the scattering layer. FIG. 4 illustrates the response, as detected by a photomultiplier, of a typical nematic liquid crystal device of the types shown in FIGS. 1–3, showing a smooth rise in the photomultiplier current output as the voltage of the applied AC signal at 10 MHz to the transducer is increased beyond the 0.4 volts RMS (10 MHz) which corresponds to threshold for the present embodiments. Thus the degree to which a device scatters light, and hence its apparent brightness or darkness to the observer may be regulated by modulating the intensity of the AC signal from the signal generator to control the ultrasonic output of the sound transducer.

In accordance with still another feature of the invention, the sound transducer may be in the form of a plurality of discrete separately actuatable units in an array, for example, comprising a row and column matrix, so that only selected areas of the layer are ultrasonically stimulated. Or for better separation, a matrixed array is constructed as illustrated in FIG. 5 and more fully described below, of completely separate, discrete elements, each of which is a device as has been described in any of the FIGS. 1-3. Then taking the case of the reflective mode as an example, selected elements are actuated and appear bright, while the remaining areas appear dark in order to display various types of information, for example, of an alpha-numeric nature. Furthermore, of the areas selected for actuation, the intensity of the AC signal to the transducer actuating that area is varied in accordance with picture-level information, thus rendering a picture display capability which includes a gray scale. To provide such selection of elements to be actuated, various known scanning mechanisms are used, so that for example, the transducers of each of the columns and rows are each sequentially energized at synchronized rates in a repetitive cycle as is common in the display art. In this manner, a complete ultrasonically-actuated liquid crystal image display system is constructed; a more detailed description will now be given in connection with the FIG. 5 illustration of one particular form of such a system.

In the FIG. 5 system, the image display panel 51 is composed of a plurality of elemental light display devices 50 at respective different picture element positions distributed over the panel in a matrix of rows and columns. Although the illustration and the description is cast in terms of rows and columns, other equivalent display patterns not depending on orthogonally-related arrays can also serve as well. Each elemental device 50 is constructed as are one of the devices 10, 20, or 30 of FIGS. 1, 2 or 3, respectively, to include an active area of liquid crystal placed between enclosing plates and a sound transducer mounted on the side of the device opposite that to be viewed. Depending on which type of construction is used, the panel will operate in either reflection, absorption, or transmission mode, with appropriate illumination. Each transducer is connected to one of the row leads 52 and one of the column leads 53, in common with other transducers of the respective row and column in which it is situated.

A column scanner 54 addresses different ones of the columns via the respective different ones of leads 53, and at the same time, a row scanner 55 addresses different ones of the rows via respective different ones of leads 52. Synchronizer 56 supplies column selection signals to the scanner 54 and row selection signals to scanner 55. The individual elemental display device is selected by a coincident addressing by the scanners of the row with the column in which the device is situated.

The scanners 54 and 55 thereby selectively deliver to the transducers of the addressed display elements actuating energization in the form of an AC signal at a potential just above the threshold requirement and at a frequency of, for example, 10 MHz, and provided by a signal generator 57. Scanner 54 transmits this signal to the column selected for addressing by that scanner, and actuation of the addressed display elements is completed by the selection of a row by scanner 55, which merely completes a return path to generator 57.

A property of the device 50 which has already been described is that the intensity of the light scattered by the individual device and consequently its degree of darkening or brightening, is a function of the ultrasound amplitude. Now this property is utilized to provide gray scale by modulating the magnitude of the AC signal above the threshold in accordance with the amplitude of a video signal from video signal source 58. Thus the degree of light scattering by the display elements is made to correspond with the level of the video signal. It should be noted that other conventional modulation techniques may also be used as well, including modulating the duration of the signal pulse; see the co-pending U.S. patent application entitled "Flat Panel Display System with Time-Modulated Gray Scale," Richard A. Easton, Ser. No. 755,961, filed Aug. 28, 1968 and assigned to the same assignee as the present invention.

Scanners 54 add 55 preferably each include a shift register that is stepped from each one output or storage to the next by a series of gating pulses in turn initiated by a timing clock that is synchronized with the signals from synchronizer 56. Thus scanner 55 selects rows sequentially in succession from top to bottom so that all rows are displayed within the desired frame time. Scanner 54 likewise sequentially selects successive columns from left to right with the synchronization being such that the addressing of all columns is completed during the time of each row selection. In this fashion, complete lines of video information are successively displayed, until one complete scan of all elements in panel 51 has been accomplished, whereupon synchronizer 56 resets the scanners so the scanning process begins anew. Other known scanning means also can be used equally effectively.

As viewed over a period of time, the image thereby formed represents a succession of frames within each of which the video information is displayed line by line, as in the conventional scanning of an image within a cathode-ray tube. Furthermore, the response time of the elemental devices may be greatly enhanced by application of an AC electric field of approximately 25 volts RMS/mil at 20 KHz as the ultrasound addressing of each element is ended, just as has recently been reported in the case of devices actuated by an electric field; see G. H. Heilmeier and W. Helfrich, *Applied Phys. Letters*, 16, 155 (1970). Thus, even with comparatively slow nematic liquid crystal devices, an ultrasonically-addressed system is operable at frame rates great enough to permit real-time display.

The display system just discussed requires arrays of elemental crystal devices, each addressed through scanning means with an ultrasonic signal modulated with video information. However, the liquid crystal devices are also useful in much more direct fashion for other types of display systems, particularly for the direct visualization of an ultrasonic field; FIG. 6 illustrates such a system. Included in the system is a tank 61 containing a liquid acoustic medium 62, water in this case. A signal generator 64 is connected to transducer 63 through amplifier 65 and furnishes an amplified AC signal. Upon actuation by the signal, the transducer propagates a sound beam toward an object 66 to be examined, resulting in an ultrasonic field in the medium beyond the object spatially-modulated with image information imparted by the object.

Opposite the transducer 63 across the tank 61 a panel 67 is mounted within the wall of the tank 61 so that it intercepts a cross-section of the aforementioned spatially-modulated sound field. The panel 67 constitutes, as in any of the FIGS. 1-3, the back plate of an ultrasonically-actuated liquid crystal device 60 constructed as any of the devices 10, 20 or 30 of those figures. Of course, operation in either reflective, transmissive, or absorptive modes is possible, with the panel 67 accordingly reflective, absorptive, or transmissive, and illumination appropriate to the desired mode; FIG. 6 illustrates the reflective mode. To insure that the maximum amount of acoustic energy is transferred from the liquid medium to the liquid crystal and to achieve greater sensitivity, the crystal layer and the back plate element of the device 60 and the liquid medium should match in acoustical impedance as closely as possible. This is preferably achieved by constructing the panel 67 so that it functions as a one-quarter-wavelength acoustical matching transformer, as is well known in the art.

With the single, modulated sound beam thus far described, the panel 67 intercepts a pattern of ultrasonic intensity variations in the form of an outline of the object 66, since the object when interposed in the sound beam "casts a shadow". The ultrasonic shadow image thus formed upon the panel in turn stimulates the liquid crystal layer of the device over those areas which are not blocked by the shadow image. The amplifier 65 helps insure that the ultrasonic intensity at the stimulated areas is above threshold. Thus, light is scattered by the stimulated areas to reproduce visually the shadow image detected at panel 67. Other modes of operation for direct imaging are equally feasible, such as imagining a sound field produced by reflecting the sound beam from the object; also, sound "lenses" may be used, for example, to change the focus of the image or to magnify the image.

Of even greater significance, a few additional components convert the system from one for direct imaging to one for holographically imaging. Specifically, a second transducer 68 connected through a second amplifier 69 to signal generator 64 is mounted on the side of tank 61 with the previously-mentioned transducer 63, to complete a system for holographically imaging the object 66, as is illustrated by FIG. 6. The second transducer 68 also propagates a sound beam toward the panel 67 having a direction of propagation with respect to that of the other beam such that both the beams converge toward a common area on the panel 67.

With the same signal source, the generator 64, being shared by both transducers, the resulting sound beams are of the same frequency and phase-coherent. Thus, while the beam from transducer 63 has the object 66 interposed in its path and becomes spatially modulated, as we have seen, the beam propagated by the second transducer 68 serving as a reference proceeds in an uninterrupted manner, interfering with the object beam as both converge toward the common area on the panel 67. The ultrasonic energy impinging upon the panel 67 accordingly varies spatially over the panel surface in intensity in accordance with the pattern of interference across the cross-section of sound field which is intercepted by the panel 67. The liquid crystal layer responds to the ultrasonic energy transmitted through the panel by scattering of the light incident upon it, as has been described, thus reproducing visually the modulated ultrasonic field as detected at the panel 67. The pattern of interference fringes which are now visible constitutes the optical analogue hologram of the object modulating the sound field, and may be captured photographically by a camera focused on the liquid crystal layer, as shown. The transparency provided by the developed negative embodies the image information carried by the modulated ultrasonic field and may be used to reproduce this information optically by the usual means for displaying holographic information.

Thus the invention is adaptable to numerous alternatives for the accomplishment of imaging through the medium of ultrasonic fields, the above-described systems being only leading examples. The basic ultrasonically-responsive liquid crystal devices are of simple design and easily fabricated to satisfy any of the configurational and lighting requirements of the various novel ultrasonic systems in which it might be embodied. Yet the performance characteristics as displays of such novel systems and devices, such as the amount of light scattering for a given actuation energy, gray-scale performance, including threshold for selectivity and general convenience in use are either comparable to or superior to known liquid crystal displays.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

WE CLAIM:

1. An acoustic-optic display device, comprising:
    a light-modulating layer comprising a nematic liquid crystal responsive to applied ultrasonic energy of the order of magnitude 10 megahertz to higher of intensity beyond a threshold value to scatter incident light;
    and means for applying to said liquid crystal layer ultrasonic energy of an intensity greater than said threshold to stimulate scattering of said incident light.

2. An acousto-optic display device as in claim 1, which further includes:
    a light-reflective layer with which said liquid crystal layer interfaces,
    and in which said light is incident upon the surface of the crystal layer opposite that of said interface.

3. An acousto-optic display device as in claim 1, which further includes:
    a light-absorptive layer with which said liquid crystal layer interfaces, and in which said light is incident upon the surface of said layer opposite that of the absorptive surface.

4. An acousto-optic display device as in claim 1, in which said light is incident upon the surface of said crystal layer opposite from the one which is viewed.

5. An acousto-optic display device as in claim 1, wherein said means for applying ultrasonic energy includes a plurality of transducers positioned so as to establish an array of said stimulated areas over said crystal layer, and which further includes means for addressing said transducers with actuating signals modulated in accordance with image information to cause said incident light to be scattered by said stimulated areas in accordance with said image information.

6. An acousto-optic display device as in claim 5, wherein said layer is separated into discrete units each including one of said stimulated areas, and wherein each of said plurality of transducers is discrete and respectively matched to one of said areas.

7. An acousto-optic display device as in claim 1, in which degree of said scattering of said incident light by said liquid crystal layer is a function of the intensity of the applied ultrasonic energy beyond threshold.

8. An acousto-optic display device as in claim 7, in which said means for applying ultrasonic energy to an area of said layer includes an ultrasonic beam source spaced from said layer, with said beam being directed toward said area, and which further includes means for spatially modulating said ultrasonic beam with image information to stimulate the scattering of said incident light from said area in accordance with said image information.

9. An acousto-optic display device as in claim 7, in which said means for applying ultrasonic energy to an area of said layer includes two sources of ultrasonic beams spaced from said layer and of the same frequency and coherent with respect to each other, whose directions of propagation make an angle with respect to each other so that both beams converge toward said area on said crystal layer, interfering thereon to form a stationary pattern of varying ultrasonic energy intensity over said area, and which further includes means for modulating one of said beams with image information so that said stationary pattern bears said information, said pattern of ultrasonic intensity variations stimulating the scattering of said incident light from said stimulated area in accordance with said intensity variations, giving rise to a visible corresponding pattern over said area which at any moment constitutes a hologram bearing said image information.

* * * * *